United States Patent
Jethani et al.

(10) Patent No.: US 8,595,739 B2
(45) Date of Patent: Nov. 26, 2013

(54) PRIORITIZED RESOURCE SCANNING

(75) Inventors: Seema V. Jethani, Cary, NC (US); Rosalind T. A. Radcliffe, Durham, NC (US); David L. Schmidt, Cary, NC (US); Janusz S. Stanson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 12/168,656

(22) Filed: Jul. 7, 2008

(65) Prior Publication Data

US 2010/0005471 A1 Jan. 7, 2010

(51) Int. Cl.
*G06F 9/46* (2006.01)
*G06F 11/00* (2006.01)

(52) U.S. Cl.
USPC .............................................. 718/104; 714/25

(58) Field of Classification Search
USPC .......................................... 718/104; 714/25
See application file for complete search history.

(56) References Cited

U.S. PATENT DOCUMENTS

| 4,817,092 A * | 3/1989 | Denny ............................ 714/10 |
| 6,125,196 A * | 9/2000 | Carey et al. ................... 382/138 |
| 2008/0040715 A1* | 2/2008 | Cota-Robles et al. ............ 718/1 |
| 2009/0024356 A1* | 1/2009 | Platt et al. ..................... 702/181 |

* cited by examiner

*Primary Examiner* — Mengyao Zhe
(74) *Attorney, Agent, or Firm* — Steven L. Nichols; Van Cott, Bagley, Cornwall & McCarthy P.C.

(57) ABSTRACT

A method for prioritized scanning of resources within an Information Technology (IT) infrastructure includes prioritizing resources by likelihood of each resource being relevant to a target problem and scanning resources that have a higher likelihood of being relevant to the target problem before scanning resources that have a lower likelihood of being relevant to the target problem. A system for prioritized scanning of an IT infrastructure includes a resource list, the resource list identifying at least a portion of resources within the IT infrastructure; a plurality of tags, each of the plurality of tags being associated with a the resource, the plurality of tags being configured to monitor the resources identified in the resource list and generate an output, the output being related to a likelihood that the resources contain information related to a problem within the IT infrastructure; and a scanning program configured to scan resources with a higher likelihood of containing information related to the problem before scanning resources with a lower likelihood of containing information relating to the problem.

21 Claims, 5 Drawing Sheets

| Symptom Pattern: E-Commerce Application Offline | | | | | | |
|---|---|---|---|---|---|---|
| Resource List | Tag Counts | | | | | Score |
| | Accesses | RFC Changes | Maintained | Problem Source | Non-RFC Changes | |
| A | 129 | 246 | 45 | 12 | 121 | 1077 |
| B | 57 | 63 | 42 | 2 | 32 | 329 |
| C | 93 | 954 | 33 | 42 | 73 | 2421 |
| Weight | 1 | 2 | 1 | 4 | 3 | |
| Score Calc. | = (Tag 1) x (Tag 1 Weight) + (Tag 2) x (Tag 2 Weight) + ... + (Tag n) x (Tag n Weight) | | | | | |

FIG. 4A

| Prioritized Scanning List | |
|---|---|
| Ordered Resources | Score |
| C | 2421 |
| A | 1077 |
| B | 329 |

PRIORITIZED RESOURCE SCANNING

BACKGROUND OF THE INVENTION

In an Information Technology (IT) environment, an awareness of the configuration, changes, and interrelationships between computing resources allows for system optimization and rapid response to faults. In some circumstances, a configuration management database may be used to keep track of computing resources, such as hardware, software, network connections, etc. Initially, a scan of the complete IT infrastructure is used to populate the configuration management database. Subsequent changes are routinely reported to the database using a "request for change" mechanism. However, activities and changes made outside of the "request for change" mechanism are sometimes not reported to the database.

As a result of these unreported activities and changes, the database can become inaccurate. When a fault or malfunction arises within the IT infrastructure, it is important to have accurate configuration information to effectively resolve the problem. If the information contained within the configuration management database is insufficient to identify the source of the problem, the entire system is often scanned to update the database. This comprehensive and indiscriminant scan of the IT infrastructure can take a significant amount of time, consume limited computing resources, and generate a large amount of data that is not related to the immediate problem.

BRIEF SUMMARY OF THE INVENTION

A method for prioritized scanning of resources within an Information Technology (IT) infrastructure includes prioritizing resources by likelihood of each resource being relevant to a target problem and scanning resources that have a higher likelihood of being relevant to the target problem before scanning resources that have a lower likelihood of being relevant to the target problem. A system for prioritized scanning of an IT infrastructure includes a resource list, the resource list identifying at least a portion of resources within the IT infrastructure; a plurality of tags, each of the plurality of tags being associated with a resource, the plurality of tags being configured to monitor the resources identified in the resource list and generate an output, the output being related to a likelihood that the resources contain information related to a problem within the IT infrastructure; and a scanning program configured to scan resources with a higher likelihood of containing information related to the problem before scanning resources with a lower likelihood of containing information relating to the problem.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Information Technology (IT) refers to the use of computer hardware and software to create, store, retrieve, convert, process, and transmit information. Many organizations create and maintain an IT infrastructure to meet the organization's needs for communication, storage, display, and analysis of information. These IT infrastructures may be made up of a large number of elements including computers, workstations, servers, networks, mobile devices, peripheral devices, embedded systems, software applications and others. The interaction and interdependencies between these elements can be complex and dynamic.

Many organizations use configuration management techniques to discover, record, optimize, and control the changes made to these elements. For example, a configuration management database can help resource management programs and engineers to know, among other things, the capabilities of their computer and communication systems, how to allocate work loads, where to initiate upgrades, and how to resolve faults within the IT infrastructure. A configuration management database may automatically scan an entire IT infrastructure initially to populate the database.

An accurate and up-to-date configuration management database can be particularly useful when a fault occurs within the IT infrastructure. Data contained with the configuration management database can be analyzed to determine the cause of the fault, the extent of the problems caused by the fault, how to reallocate resources to compensate for the fault, etc. However, if the information within the database is inaccurate or incomplete, the usefulness of the database is substantially reduced. Inaccurate data can increase the amount of time it takes to find the source of a fault and lead to a less than optimal response to the fault.

When changes are made within the IT infrastructure, the changes are typically made according to a Request For Change (RFC) procedure. The RFC allows the configuration management database to be updated each time a change is made. However, changes are sometimes done outside of the RFC procedure, and may go undetected. Consequently, the database may contain inaccurate information about the IT infrastructure. To update the database, scans of the IT infrastructure may be periodically performed to discover unreported changes. A complete scan of an IT infrastructure can be a time and resource intensive operation. For large systems, a full scan might take several days.

Moreover, if a needed scan to update the configuration management database has not been performed and a fault occurs, if may not be feasible to then perform the scan and update the configuration management database. For example, if the fault is critical, the time required for a complete scan may be unavailable. Additionally, scans of the IT infrastructure are typically indiscriminate. Each element in the IT infrastructure is scanned without regard to the likelihood that that element may be the cause of the target fault. This can generate a large amount of data which is not directly relevant to the target fault. Limited IT resources are consumed to transfer, store, and analyze this largely irrelevant data.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The method, systems and techniques described herein allow resources in an IT environment to be scanned in a prioritized order. Resources which are more likely to contain information relevant to the target fault or to have contributed to the target fault are identified and scanned before other resources. This increases the probability that changes made outside an RFC procedure will be discovered more quickly. This does not eliminate the need to perform periodic full system scans, but it allows changes that are likely to create problems to be discovered more quickly.

Resources are prioritized using a tagging system. A tag is a label or piece of data associated with a resource which monitors one or more events or conditions and maintains a count of how often the event or condition occurs. For example, the tag may monitor how often a resource is accessed, how often the resource is discovered to be the source of a problem, the number of changes made to the resource or any number of other events or conditions. These counts may be used singly or in combination with other criteria to identify resources that are more likely to be related to a target fault. According to one illustrative embodiment, a weighted sum of one or more counts can be used to determine the scanning priority of that resource. A higher weighted sum would typically indicate a higher likelihood that the resource contains relevant information to a target fault.

Figure 1:
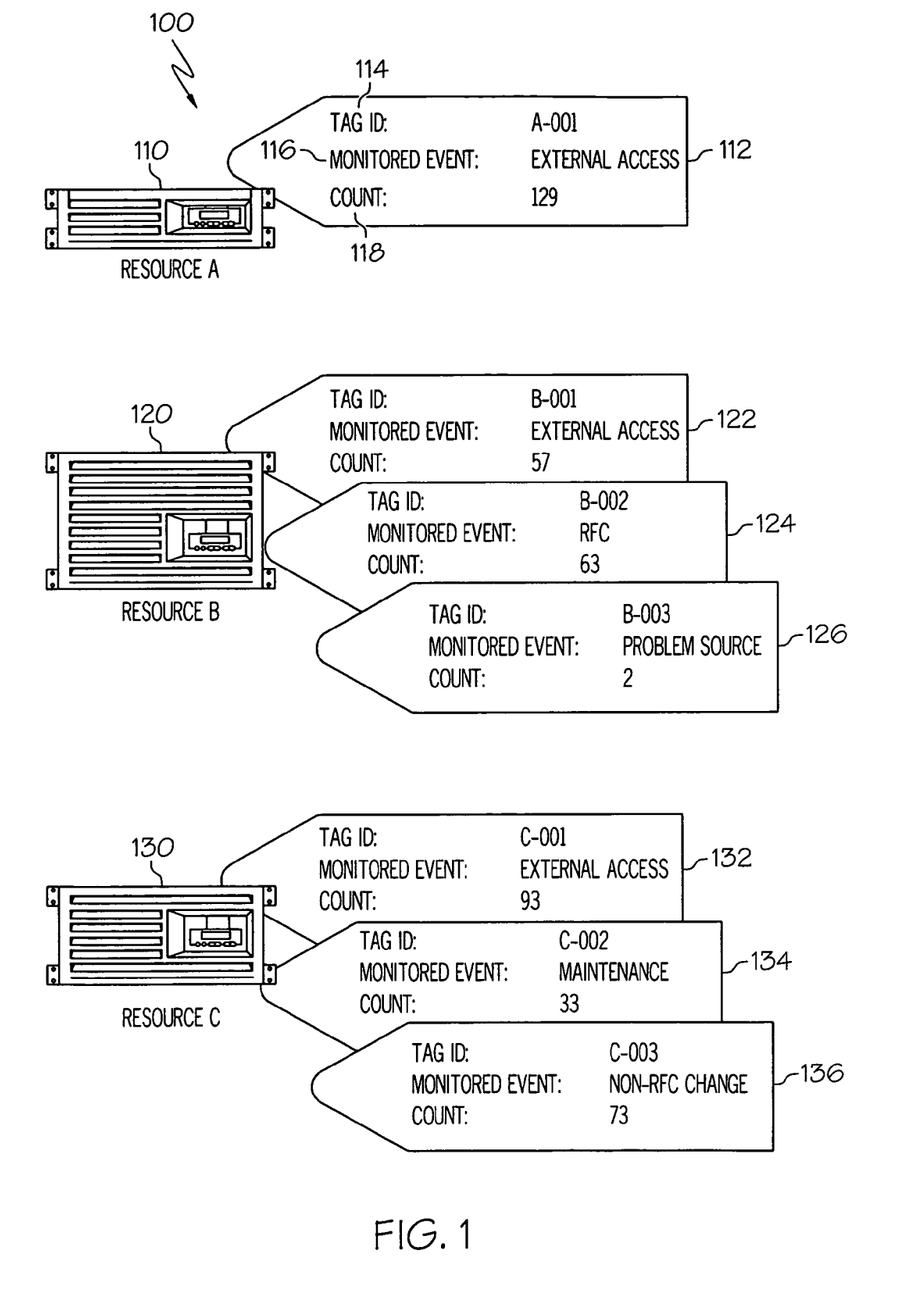
FIG. 1 is an illustrative diagram of IT resources and associated tags, according to one embodiment of the principles described herein.

FIG. 1 is a diagram of several resources (110, 120, 130) and their associated tags. Resource A (110), resource B (120), and resource C (130) represent illustrative resources in an IT environment. As mentioned above, these resources may be any one of a variety of software or hardware elements within an IT infrastructure. In some instances, a tag can be associated with a group or system of elements.

A single tag (112) is shown attached to Resource A (110). According to one embodiment, the tag (112) associated with resource A (110) has three attributes: a tag identifier (114), a trigger event (116), and a count (129). Tag identifier (114) is name or label that uniquely identifies the tag. The tag identifier (114) may also incorporate the name of the associated resource. The monitored event (116) identifies an event or condition that the tag is designed to monitor. The count (118) keeps a running record of the number of times a monitored event occurs. For example, a tag (112) may monitor the number of times resource A (110) is accessed by an external entity. Each time an external entity accesses resource A (110) a triggering event (116) occurs and the count (118) is incremented.

A tag may have any number or variety of different attributes not shown in FIG. 1, as best suits the application. For example, the count may be made over a given time period and then reset so that a count of the corresponding event per unit time is measured. In one embodiment, the count could be a running total of the number of times a triggering event occurs with a three month time period.

A given resource also may have any number of tags associated with it, as best suits the circumstances and needs of an organization. For example, resource B (120) is associated with three tags: a B-001 tag (121), a B-002 tag (122), and a B-003 tag (123). The B-001 tag (122) monitors accesses by external entities. The B-002 tag (124) monitors the number of times resource B (120) was changed through a request for change (RFC). In the example illustrated in FIG. 1, resource B (120) has been changed through an RFC a total of 63 times. The B-003 tag (126) monitors the number of times that resource B (120) was discovered to be the source of a fault and has a count of two. For example, a web page may be displaying improperly. A resource scan might discover that the source of the fault was a change to resource B (120). This discovery would cause the problem source count within tag B-003 (126) to be incremented by one.

Resource C (130) also has three tags attached: a C-001 tag (132) which monitors the number of times Resource C (130) was accessed by an external entity, a C-002 tag (132) which monitors the number of times Resource C (130) was maintained, and C-003 (136) which monitors the number of times a non-RFC change was made to Resource C. The "Non-RFC Changes" tag (133) indicates that changes have been made to Resource C (130) by some means other than an RFC a total of 73 times during a given time period. According to one illustrative embodiment, the count values of the various tags are updated in real time. In this way, accurate count values are immediately available when a fault occurs.

Figure 2:
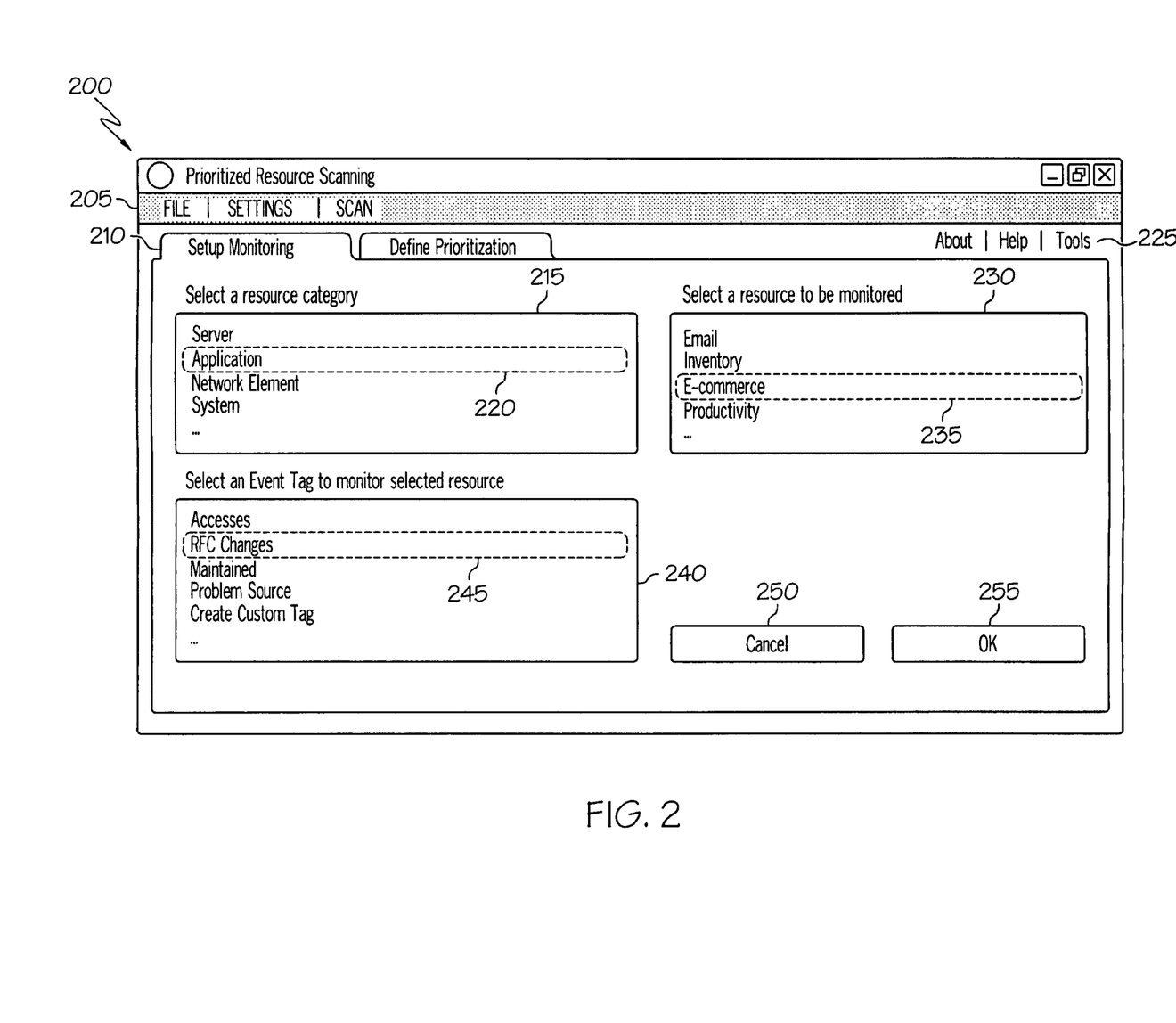
FIG. 2 is a diagram of an illustrative software interface for selecting an IT resource and associating tags with that resource, according to one embodiment of the principles described herein.

FIG. 2 is a diagram of an illustrative software interface (200) for selecting an IT resource and associating tags with that IT resource. The software interface (200) may operate as a smaller part of an integrated IT management software program or may operate independently of any specific program. In cases where the software interface (200) operates independently of other programs, the software interface (200) may be designed to interface with a variety of pre-existing programs on the user's system. According to one exemplary embodiment, the software interface (200) includes a menu bar (205) that allows a user to access various modules or functions within the software interface (200). Any number of other menus (225) could be used to facilitate the use of the software interface (200).

According to one illustrative embodiment, a "Setup Monitoring" module (210) may allow a user to select a resource within the IT infrastructure and associate a pre-defined tag with the selected resource. Alternatively or additionally, the user may define a custom tag to associate with a selected resource.

By way of example, a first window (215) within the interface (200) may prompt the user to select a resource category. By way of example and not limitation, the resource categories may include servers, applications, network elements such as routers or connections, various subsystems, and other appropriate categories. Once the user has chosen a general tag type, a second window (230) could be populated with a list of specific resources within the selected resource category. For example in the first window (215) the user has selected the "application" resource category as indicated by a first dotted outline (220). The second window (230) displays the specific applications that are found within the IT infrastructure. The user has selected the "E-commerce" application (235) as the specific resource that the user desires to monitor using a tag.

A third window (240) allows the user to select a predefined tag or create a custom tag to monitor the resource selected above. There may be any number of predefined tags which are available for a user to select. However, the user may desire to create a custom tag to monitor a specific resource, event, system, or combination of resources that is not contained within a predefined tag. The user may then select an option for creating a custom tag and will be guided through the process of creating a custom tag.

In the example shown in FIG. 2, the user has selected an "RFC Changes" tag (245) to be associated with the E-commerce application (235) that was selected above. The user may click the Cancel button (250) to cancel setup monitoring process. When the user has finished with the setup process, clicking the OK button (260) could save the tag and association data that links the tag to the selected resource.

As illustrated in FIG. 1, any number of tags can be associated with a particular resource to monitor various events. The user may follow a process similar to that described above to associate additional tags with a resource. In this manner, the user can monitor a number of events that will allow an estimate to be made of likelihood that a resource is contributing to a given fault.

In one embodiment, the software interface may access a configuration management database and analyze its contents to automatically associate a number of tags with critical resources. A template could be provided which would direct this automated process. This could save a significant amount of time for the user, who could then simply review the automatic monitoring scheme or template and make changes as desired. For example, by default, resources could be tagged based on how often they are accessed. Further customization, including the decisions of about which resources to tag or which additional tags to associate with selected resources could be left for the user to define.

Additional options and tag attributes could be provided to allow the users to further customize the properties of various tags. By way of example and not limitation, the user may choose to have a tag count only reflect triggering events which have occurred in the past three months. The user may also choose to have a tag only monitor the actions of an individual or group of individuals. These and other customized changes could be made through software similar to the prioritized resource scanning application (200) as best suits the needs of a specific organization.

Figure 3:
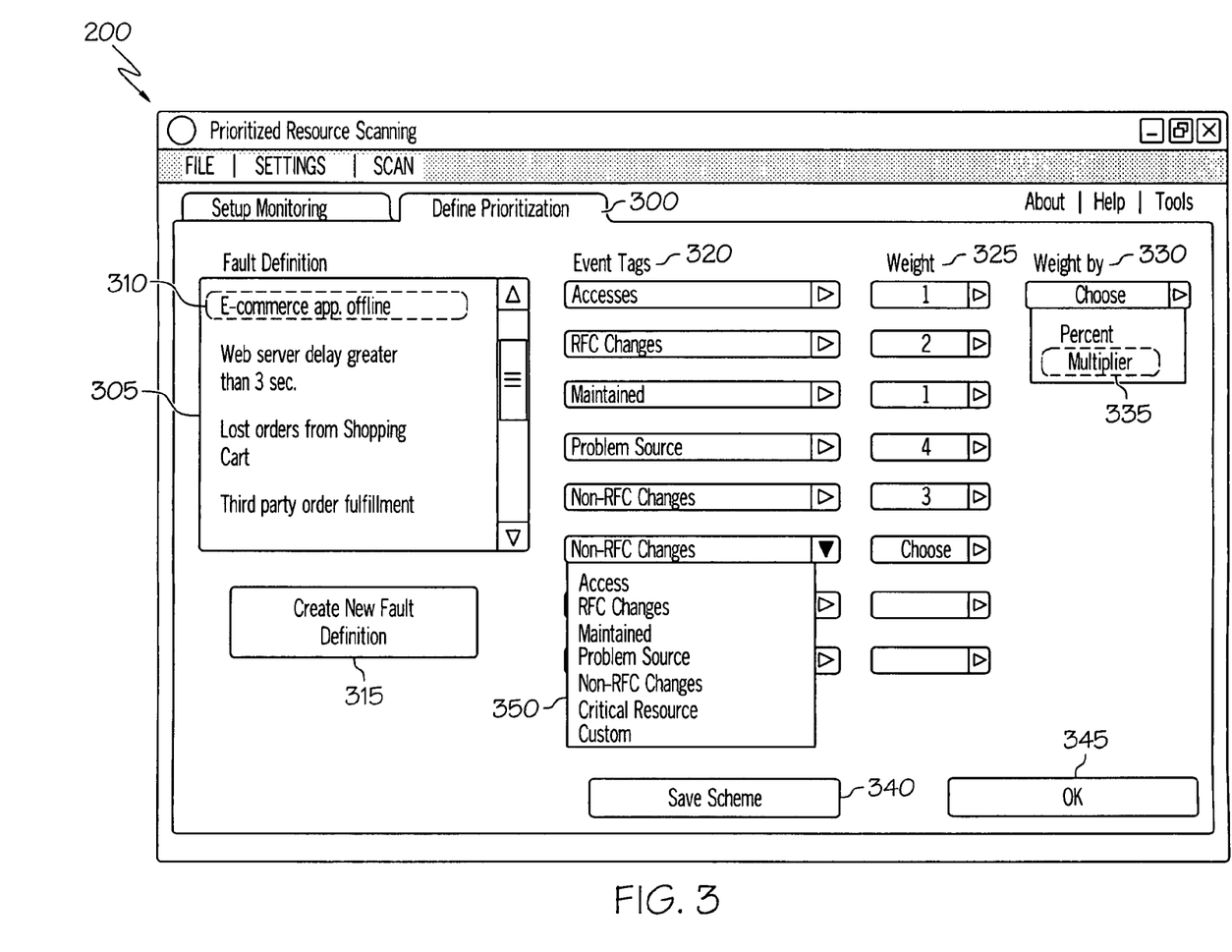
FIG. 3 is a diagram of an illustrative software interface for selecting a triggering problem definition and associating a score calculation with the selected problem definition, according to one illustrative embodiment of the principles described herein.

FIG. 3 is a diagram of an illustrative software interface (200) for selecting a fault definition and associating a score calculation with the selected fault definition. A fault definition is a description of a problem within the IT infrastructure. According to one embodiment, each fault definition may be associated with a different equation for combining tag counts. In this way, a different prioritized list is generated for each fault definition. When an IT professional is faced with a problem, they can select a fault definition that closely matches the problem. The fault definition and its associated equation are then used to generate a prioritized list that points out resources that have a relatively high probability of being a source of that particular problem.

The software interface (200) includes a "Define Prioritization" module (300) for defining the way in which various tag counts are combined to create a weighted score for a resource. According to one exemplary embodiment, the user first selects a fault definition from a scroll down window (305). In the example illustrated in FIG. 3, the user has selected the fault definition "E-commerce app. offline" (310). If a desired fault is not defined, the user may click on a "Create New Fault Definition" button (315) to create a fault definition, also referred to as a symptom pattern, that is especially adapted to a target situation.

Once the fault definition specifying a particular resource has been chosen, the user can then designate a number of tags (320) and weights (325) associated with that resource. The weights assigned to the tags may allow the user to designate which tags are more important for a particular fault definition. For example, when scanning the IT environment for the source of a problem, the fact that a resource was discovered to be the source of the same problem in the past may be much more important than the fact that it was included in several RFCs. Accordingly, in this particular example, the weight of the RFC Changes count has been set to 2, and the weight of the Problem Source count has been set to 4.

The importance of a particular tag can be emphasized by placing a large weight multiplier next to that tag. For example, there may be a problem which the user recognizes from previous experience. The user may know that this problem was previously caused by a resource being changed outside an RFC, but may not remember exactly which resource was the source of the problem. Consequently, weighting the "Non-RFC Change" tag or the "Problem Source" tag very highly may allow the problem to be discovered more quickly. In another example, a problem may have occurred immediately after system maintenance was performed. In this case, the user might set the weight for the "Maintained" tag extremely high so that resources that were recently maintained would have a higher scanning priority.

A variety of other functions could be included in the interface (200). By way of example and not limitation, there could also be a "Weight by" option (330) which allows the user to weight the various counts by percentages or by whole number multipliers. According to one exemplary embodiment, there may be a button (340) to save the weighted sum function. After configuring the tags and their weights, the user may press the "OK" button (350) to use the weighted sum function when scanning priorities are calculated.

Figure 4A:
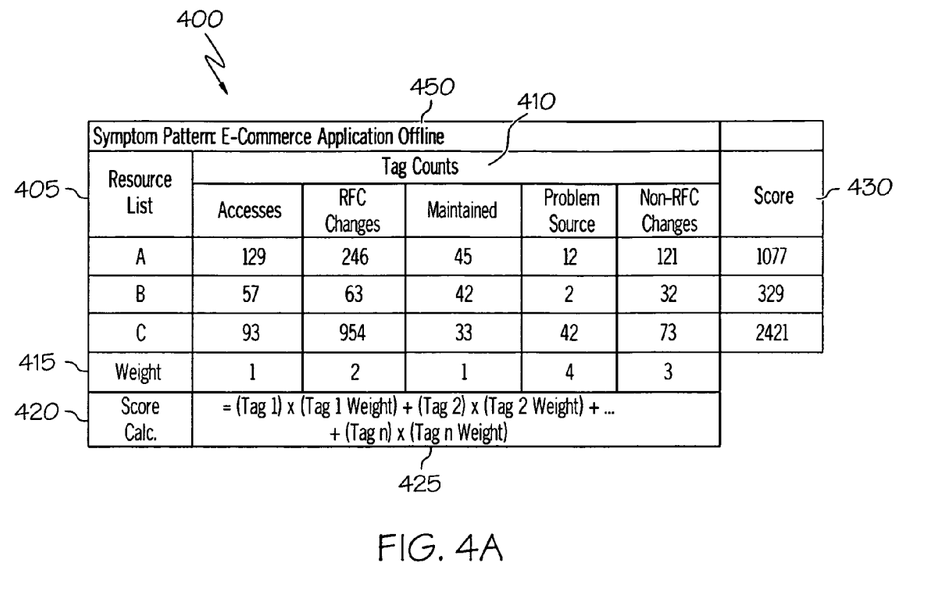
FIG. 4A shows an illustrative application of a score calculation of tag counts to produce a weighted score for several resources, according to one embodiment of principles described herein.

FIG. 4A is a table (400) illustrating how a weighted score calculation (420) might be applied to tag totals to generate a prioritized list of resources. In this illustrative example, the fault definition is "E-Commerce application offline" (450) and the associated score calculation (420) is a simple weighted sum of the various tag counts. However, the algorithm used to calculate the score for a resource could be any mathematical formula which suits the needs of the user.

The resource list (405) is shown in the left column and the various tags counts (410) are shown in center columns. The weights for each type of tag count are shown in the weight row (440) near the bottom of the table. The result of the score calculation is a score (430) for each resource. According to one embodiment, the score (430) is a numeric value which represents the likelihood of the resource contributing to the selected fault definition.

As indicated by the algorithm (425), any number of tags (from 1 to n) may be used to calculate the scanning priority. The value of each tag count is multiplied by that tag's weight, producing a weighted value. All weighted values are then added together to produce the score (430).

For example, the first row of the table (400) shows that resource A was accessed 129 times, had 246 RFC changes, was maintained 45 times, was found to the source of a problem 12 times and had 121 non RFC changes made. Applying the score calculation formula (420) results in the following equation:

$$\text{Score for resource } A = (129)*(1)+(246)*(2)+(45)*(1)+ (12)*(4)+(121)*(3)=1077$$

The scores for the remaining resources are calculated in a similar manner.

Figure 4B:
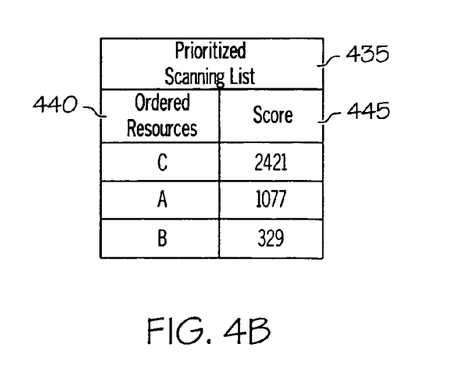
FIG. 4B shows several resources ordered by weighted score to produce a prioritized scanning list, according to one embodiment of principles described herein.

FIG. 4B shows an illustrative diagram of several resources (440) ordered by weighted score (445) to produce a prioritized scanning list (435). According to one illustrative embodiment, higher scores indicate a greater likelihood that a given resource will be a source of the target problem. Consequently, in generating a prioritized scanning list (435) the resources are ordered according to descending score.

The various resources are then scanned in order according to the prioritized scanning list (435). This potentially decreases the amount of time required to discover the source of the target problem, which can be particularly important when the problem affects a critical function of an organization. By scanning first the resources which are most likely to be the source of the target problem, the duration of the scan will probably be shorter, resulting in less network traffic, a reduced amount of storage space used to store the discovery information, and fewer processor resources consumed to analyze the discovery information.

It will be appreciated by those of skill in the art that the systems and methods described above are only a few examples of possible implementations of prioritized resource scanning. A variety of other implementations could be used. By way of example and not limitation, the fault definition within the IT infrastructure may not be required to trigger a scan. Even regular periodic scans to maintain the integrity of the database can benefit from a prioritization scheme. A priority scheme could reduce the scope of the periodic scan by allowing high priority resources to be scanned during each periodic scan, while lower priority resources could be scanned less often.

In some alternative embodiments, fault definitions may not be included in the prioritization process at all. For example, the system could scan a resource list and the tags associated with the resources to determine which resources are more likely to require higher prioritization in general. Tags may track which resources are most often accessed, changed, or updated. These resources may be assigned a higher prioritization and be scanned first, regardless of whether the scan was a periodic scan or a scan triggered by a fault.

Figure 5:
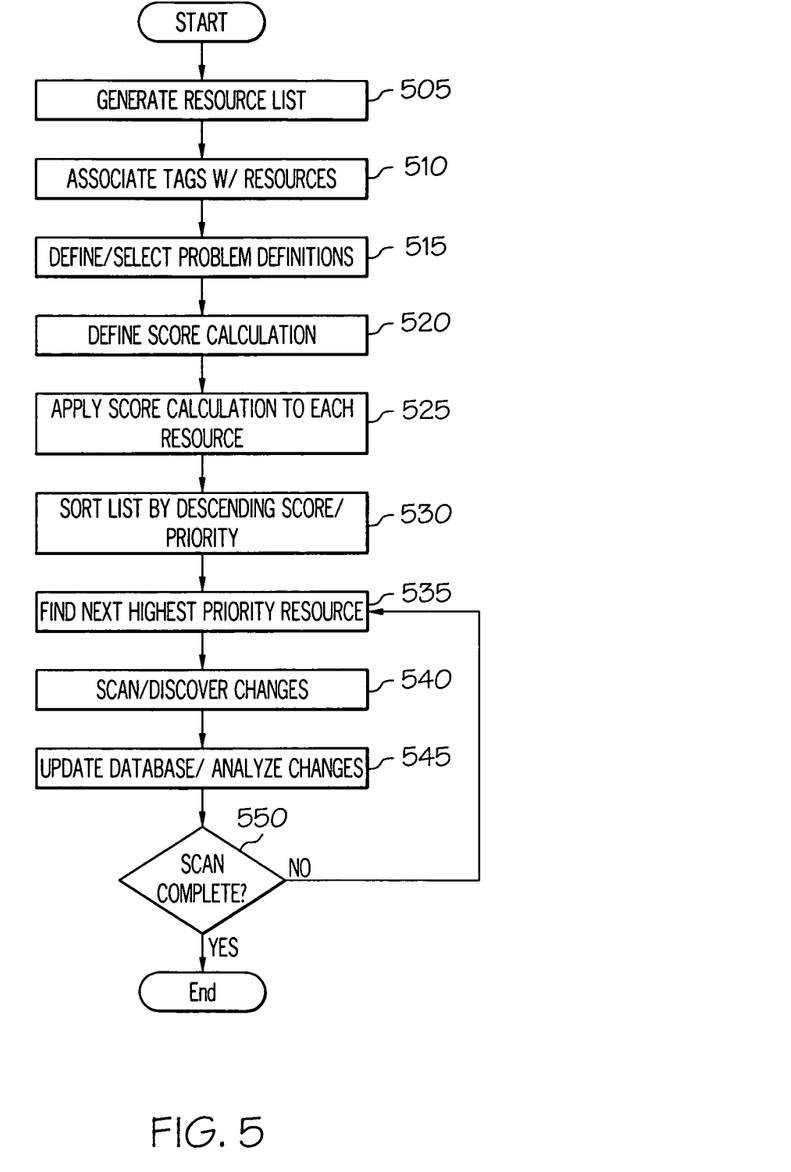
FIG. 5 is a flowchart showing a method for prioritized scanning of resource in an IT environment, according to one embodiment of the principles described herein.

FIG. 5 is a flowchart showing an illustrative method of prioritized scanning for resource changes in an IT environment. According to one embodiment, the first step is to generate a resource list that represents significant elements within the IT environment (step 505). A number of tags which are configured to monitor events and keep a count of event occurrences are then selectively associated with at least some of the elements on the resource list (step 510).

According to one exemplary embodiment, fault definitions are then selected or defined (step 515). As mentioned above, fault definitions are optional and represent only one embodiment of the principles disclosed herein. A score calculation is then defined for each fault definition (step 520). The fault definitions may take a variety of forms. According to one embodiment, the fault definition is a simple textual description of a specific category of issues which may arise in an IT infrastructure. In an alternative embodiment, the fault definition may comprise a number characteristics or symptoms of the problem which allow a user or a computer to automatically categorize a current situation within a fault definition. These fault definitions may be created and contained within a software product as defaults and/or may be created and modified by the user.

By associating a score calculation with a fault definition, a prioritized scanning order can be generated that is specific to a given situation. For example, an optimized scanning order for a problem with an E-commerce server would be different than an optimized scanning order for a problem with software that communicates finalized orders to a third party for fulfillment. By capturing a method of generating a prioritized list as an equation associated with each fault definition, the effectiveness of the equation in generating a prioritized list can be tested and optimized.

The score calculation is then applied to each resource on the resource list (step 525). According to one exemplary embodiment, the inputs to the score calculation are the counts of monitored events generated by the tags associated with the resource. The output of the score calculation may be a score: a single numeric value which estimates the likelihood that scanning the resource will reveal relevant information in solving the problem. In other embodiments, the score calculation may be more complex and result in the output of one or more values, variables, secondary equations, or the like.

The list is then sorted by descending score/priority so that resources with the highest score are at the top of the list (step 530). This generates a prioritized resource scanning list that is used when scanning the IT environment. The scanning program then finds the highest priority resource on the prioritized resource scanning list (step 530). That resource is scanned to discover changes, configuration, or other information (step 540). The discovered information is written to a database and analyzed (step 545).

Following the scanning of a resource, the scanning program determines if the scan if complete (step 550). By way of example and not limitation, the scan may be complete if all the resources on the resource list have been scanned, if the source of the current problem has been discovered, if all the changes made to the IT infrastructure are discovered, or other similar criteria. If the scan is not complete, the process returns to find the next highest priority resource (step 535). The scanning then proceeds as described above. If the scan is complete, the scanning process ends.

The flowchart of FIG. 5 is only one illustrative embodiment of a method for prioritized scanning of an IT infrastructure. A person skilled in the art will appreciate that there are a number of alternative workflows which could be used for prioritized scanning of an IT infrastructure. By way of example and not limitation, various sections of the workflow could be performed at different times. The preparatory steps of generating a resource list (step 505), associating tags (step 510), defining problem definitions (step 515), and defining score calculations (520) could be performed significantly before the actual scanning process is performed. For example, the preparatory steps may be performed by the vendor of the scanning program and make up a default configuration.

In alternative embodiments, a number of steps shown in the flowchart could be omitted. For example, in a simplified method only one tag type may be required. A tag type may monitor the total number of accesses that are made to each resource. The steps of selecting problem definitions (step 515), defining a score calculation (step 520) and applying a score calculation (step 525) could be omitted in this case because there is only one tag type. Consequently, there is no need to create various problem definitions and score calculations to combine various tag types. The count of each tag becomes the score of the resource.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for prioritized scanning of resources within an Information Technology (IT) infrastructure comprises:
   prioritizing resources by likelihood of each resource being relevant to a target problem;
   scanning resources that have a higher likelihood of being relevant to said target problem before scanning resources that have a lower likelihood of being relevant to said target problem; and
   associating at least one tag with a respective said resource, wherein each tag monitors an event and increments a count when that event occurs at the resource associated with that tag, and said prioritizing resources is performed based on said counts as tracked by respective tags.

2. The method of claim 1, further comprising:
generating a resource list, said resource list identifying said resources within said IT infrastructure; and
associating at least one tag with a respective said resource.

3. The method of claim 2, further comprising creating said tag by selecting a resource in said infrastructure and an event that occurs at that resource, wherein occurrences of said event are to be counted by said tag.

4. The method of claim 1, further comprising counting occurrences of said event per specified time period.

5. The method of claim 1, wherein said event comprises said associated resource being accessed, said count being incremented each time said associated resource is accessed.

6. The method of claim 1, wherein said prioritizing resources by likelihood of each resource being relevant to a target problem is performed based on said counts of event occurrences at said resources.

7. The method of claim 1, wherein multiple tags are associated with a said resource, each of said multiple tags generating a count of occurrences of a different event.

8. The method of claim 7, wherein said prioritizing resources by likelihood of each resource being relevant to a target problem is performed based on a weighted analysis of said counts generated by said multiple tags.

9. The method of claim 1, wherein said prioritizing resources by likelihood of each resource being relevant to a target problem comprises defining a score calculation, said score calculation using a count from a tag associated with a resource to compute a score for that resource, a score being computed for each resource in said infrastructure.

10. The method of claim 9, wherein higher scores represent a higher likelihood that said resource associated with a said higher score will contain information relevant to said target problem; said prioritized resource list being sorted according to descending values of said score.

11. The method of claim 9, wherein said prioritizing resources by likelihood of being relevant to said target problem comprising ordering said resource list according to said scores.

12. The method of claim 11, wherein said scanning resources that have a higher likelihood of being relevant to said target problem before scanning resources that have a lower likelihood of being relevant to said target problem comprises scanning said IT infrastructure according to said prioritized resource list.

13. The method of claim 9, further comprising making a first score calculation associated with a first target problem and a second score calculation associated with a second target problem, said first score calculation and said second score calculation generating different prioritized resource lists.

14. The method of claim 13, further comprising:
selecting a prioritized resource list corresponding to a current target problem;
wherein scanning resources that have a higher likelihood of being relevant to said target problem before scanning resources that have a lower likelihood of being relevant to said target problem comprises scanning said IT infrastructure according to said selected prioritized resource list.

15. A system for prioritized scanning of an Information Technology (IT) infrastructure comprising:
a computer for interfacing with said IT infrastructure;
a configuration management database maintained by said computer;
a resource list, said resource list identifying at least a portion of resources within said IT infrastructure;
a plurality of tags, each of said plurality of tags being associated with a said resource, wherein each tag monitors an event and increments a count when that event occurs at the resource associated with that tag, said plurality of tags being configured to monitor said resources identified in said resource list and generate an output, said output being related to a likelihood that said resources contain information related to a problem within said IT infrastructure; and
a scanning program configured to prioritize said resources and scan resources with a higher likelihood of containing information related to said problem before scanning resources with a lower likelihood of containing information relating to said problem, said prioritizing resources being performed based on said counts as tracked by respective tags,
wherein information discovered by said scanning program when scanning said resources updates information about said resources in said configuration management database.

16. The system of claim 15, wherein said scanning program further comprises a score calculation, said score calculation using counts from said tags to generate a score for each said resource.

17. The system of claim 16, wherein said resource list is ordered according to said scores for said resources.

18. A computer program product for prioritized scanning of resources within an IT infrastructure, the computer program product comprising:
a computer usable storage memory having computer usable program code embodied therewith, the computer usable program code comprising:
computer usable program code configured to associate at least one tag with a respective said resource, wherein each tag monitors an event and increments a count when that event occurs at the resource associated with that tag;
computer usable program code configured to calculate a relative priority between said resources in said IT infrastructure, said relative priority defining a likelihood that each resources is involved in causing a current problem, said prioritizing resources is performed based on said counts as tracked by respective tags; and
computer usable program code configured to scan said resources within said IT infrastructure according to said relative priority.

19. The method of claim 1, further comprising using information discovered by said scanning when scanning said resources to update information about said resources in a configuration management database.

20. The method of claim 19, further comprising using said updated configuration management database to determine a source of said target problem.

21. The method of claim 1, wherein said prioritizing resources is based on a fault definition corresponding to said target problem, wherein different fault definitions corresponding to different target problems provide different prioritization of said resources as to likelihood of each resource being relevant to a corresponding target problem.

* * * * *